United States Patent
Anderson et al.

(10) Patent No.: US 6,493,028 B1
(45) Date of Patent: *Dec. 10, 2002

(54) METHOD AND SYSTEM FOR EXTENDING THE AVAILABLE IMAGE FILE FORMATS IN AN IMAGE CAPTURE DEVICE

(75) Inventors: Eric C. Anderson, San Jose, CA (US); Patricia Scardino, Fremont, CA (US)

(73) Assignee: FlashPoint Technology, Inc., Peterborough, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,794

(22) Filed: Nov. 26, 1997

(51) Int. Cl.[7] .............................. H04N 5/76; H04N 7/00
(52) U.S. Cl. ................. 348/222; 348/231.6; 348/231.7; 348/552; 382/232
(58) Field of Search ................. 348/231, 232, 348/233, 552, 222.1, 231.99, 231.2, 231.3, 231.6–231.9; 382/232; H04N 7/00, 5/76

(56) References Cited

U.S. PATENT DOCUMENTS

| | | | | |
|---|---|---|---|---|
| 5,396,343 A | * | 3/1995 | Hanselman | 358/426 |
| 5,682,441 A | * | 10/1997 | Ligtenberg et al. | 382/232 |
| 5,786,851 A | * | 7/1998 | Kondo et al. | 348/232 |
| 5,926,208 A | * | 7/1999 | Noonen et al. | 348/17 |
| 5,938,766 A | * | 8/1999 | Anderson et al. | 348/233 |
| 6,052,555 A | * | 4/2000 | Ferguson | 348/12 |

FOREIGN PATENT DOCUMENTS

| | | | | |
|---|---|---|---|---|
| WO | 9114334 | | 9/1991 | H04N/1/21 |
| WO | 92/09169 | * | 5/1992 | H04N/5/30 |

OTHER PUBLICATIONS

"An Image Data File Format for Digital Still Camera," Mikio Watanabe et al.

"The FlashPix Image File Format," Christopher R. Hauf et al.

* cited by examiner

Primary Examiner—Ngoc-Yen Vu
(74) Attorney, Agent, or Firm—Sawyer Law Group LLP

(57) ABSTRACT

A system and method for adding file formats to a digital imaging device is disclosed. The digital imaging device includes a built-in file format. The method and system include allowing a user to loading a first file extension module, providing a management layer, and providing a plurality of data processing utilities. The first file extension module includes a second file format. The management layer communicates with the first file extension module to write and read an image file having the second file format. The management layer also communicates with a portion of the digital imaging device using an internal format. The plurality of data processing utilities are for converting data to between the second file format and the internal format.

32 Claims, 12 Drawing Sheets

METHOD AND SYSTEM FOR EXTENDING THE AVAILABLE IMAGE FILE FORMATS IN AN IMAGE CAPTURE DEVICE

FIELD OF THE INVENTION

The present invention relates to image capture devices and more particularly to a method and system for extending the available file formats in an image capture device.

BACKGROUND OF THE INVENTION

Conventional digital cameras store captured image files. Each image file that has completed processing has a particular file format. Each file format may include a particular type of data compression performed on image data, such as JPEG, and may locate image data or other information regarding the image in a specific portion of the image file. Often, different file formats are incompatible.

Conventional digital cameras are built with support for a single, built-in file formats. After image processing is completed, the image file is stored in the particular built-in file format. This built-in file format, which may or may not be a standard file format, can include formats such as FLASHPIX. Consequently, images can only be stored in or read from the built-in file formats already supported by the digital camera.

A user may desire a file format which is different from file format supported by the digital camera as built. Moreover, a removable memory inserted into the digital camera may contain image files having a format different from the built-in file format for the digital camera. A user may wish to display the images contained in these image files using the digital camera.

Accordingly, what is needed is a system and method for extending the available file formats, or allowing additional file formats to be available, in an image capture device, such as a digital camera. It would also be beneficial if the new available formats were automatically reported to the user. The present invention addresses such a need.

SUMMARY OF THE INVENTION

The present invention provides a method and system for adding file formats to a digital imaging device which includes an available built-in first file format. The method and system comprise allowing a user to load a first file extension module, providing a management layer, and providing a plurality of data processing utilities. The first file extension module includes a second file format. The management layer communicates with the first file extension module to write and read an image file having the second file format. The management layer also communicates with a portion of the digital imaging device using an internal format. The plurality of data processing utilities are for converting data to between the second file format and the internal format.

According to the system and method disclosed herein, the present invention is capable of increasing the available file formats for an image capture device.

DETAILED DESCRIPTION OF THE INVENTION

The present invention relates to an improvement in digital imaging devices, including digital cameras. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any image capture device which displays images, icons, and/or other items could incorporate the features described hereinbelow and that device would be within the spirit and scope of the present invention. Thus, the present invention is not intended to be limited to the embodiment shown, but is to be accorded the widest scope consistent with the principles and features described herein.

Conventional digital cameras store captured images in a built-in file formats. The built-in file formats may use a particular type of data compression such as JPEG, may locate image data or other information about the image in a specific portion of the image file, and be is often . incompatible with other file formats. An example of the built-in file formats, which may or may not be a standard file format, includes FLASHPIX. Conventional digital cameras typically utilize only one file formats, the built-in file format, for storing image files.

Although conventional digital cameras are capable of storing images in a known, built-in file format supported by the digital camera, those with ordinary skill in the art will realize that the available file formats in a conventional image capture device, such as a digital camera, are fixed. Images can only be stored in or read from the file format already supported by the digital camera. Such conventional digital cameras are, therefore, incapable of supporting new formats.

The present invention provides for a method and system which is capable of extending the available file formats, or allowing additional file formats to be available, in an image capture device. The present invention will be described in terms of allowing additional file formats to be available on a digital camera. However, one of ordinary skill in the art will readily recognize that this method and system will operate effectively for other types of digital imaging devices.

Figure 1:
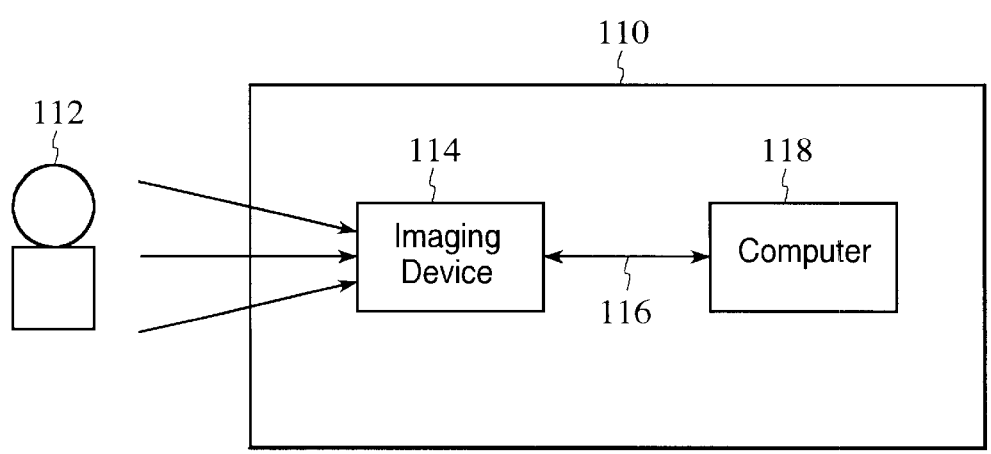
FIG. 1 is a block diagram of a digital camera that operates in accordance with the present invention.

FIG. 1 is a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 1118.

Figure 2:
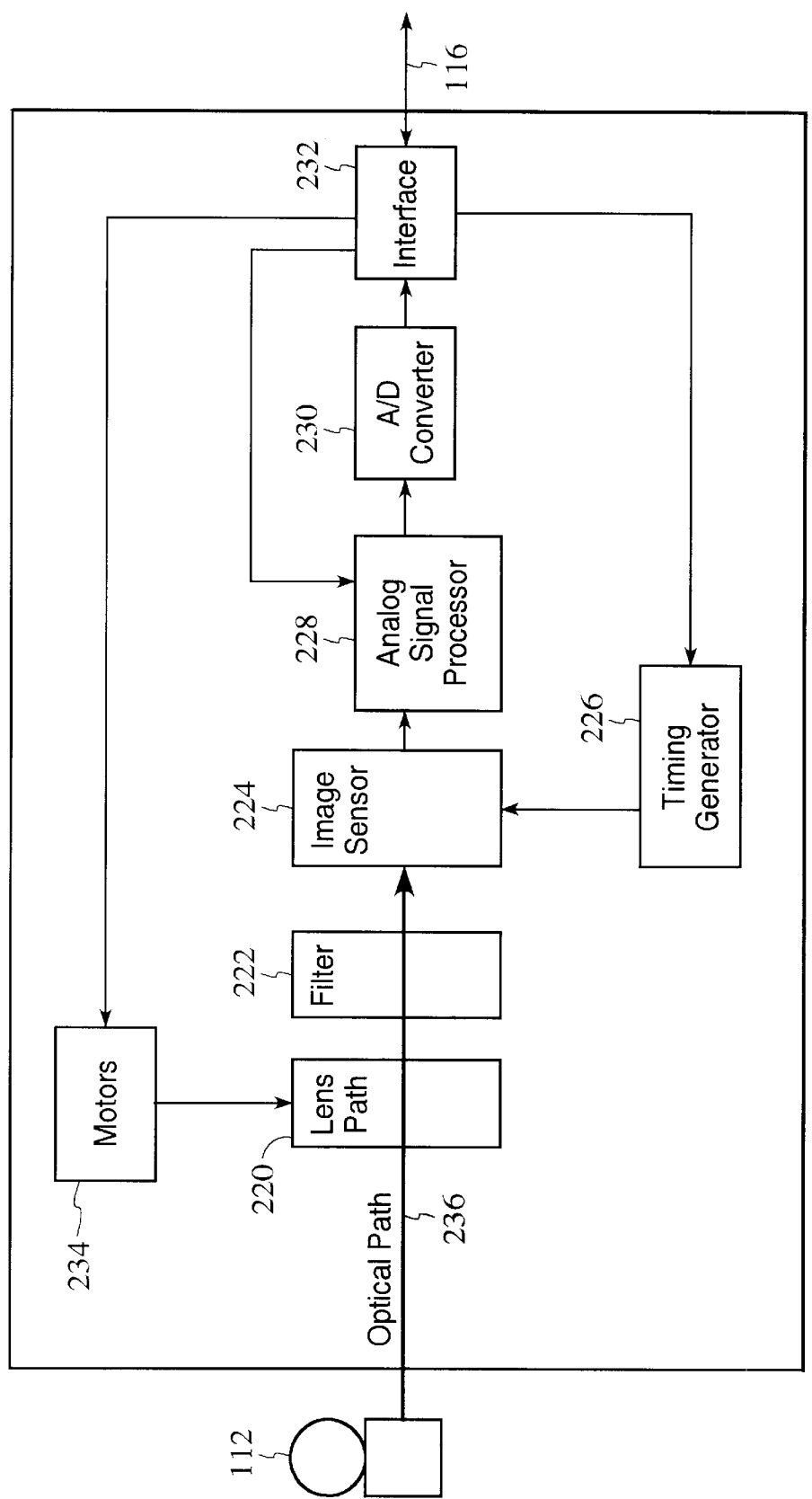
FIG. 2 is a block diagram of one embodiment for the imaging device of FIG. 3.

Referring now to FIG. 2, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A!D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
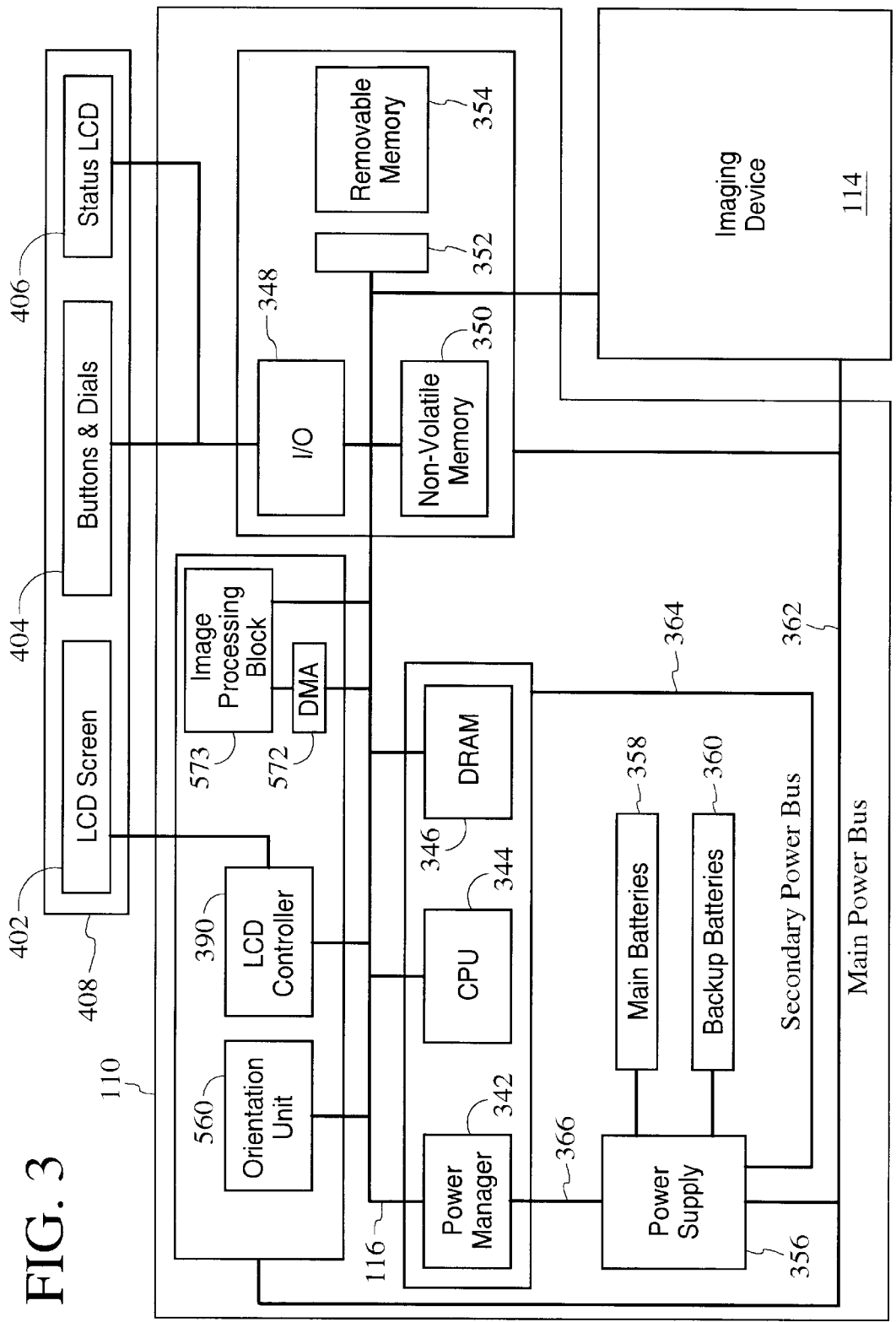
FIG. 3 is a block diagram of one embodiment for the computer of FIG. 2, where image processing is done at least partially in hardware.

Referring now to FIG. 3, a block diagram of one embodiment for computer 118 is shown. In one embodiment, the computer 118 in FIG. 3 provides at least a portion of image processing in hardware using image processing block 573. Thus, in one embodiment the computer 118 has DMA unit 572 for transfers of data to and from the image processing block 573. However, nothing prevents the method and system from being used in a camera 110 which processes image data in software. In such a system, the image processing block 573 would be omitted. In one embodiment, DMA 572 is programmable by the central processing unit (CPU) 344.

System bus 116 provides connection paths between imaging device 114, an optional power manager 342, CPU 344, dynamic random-access memory (DRAM) 346, input/output interface (I/O) 348, non-volatile memory 350, DMA 572, image processing block 573, orientation unit 560, and buffers/connector 352. Removable-memory 354 connects to system bus 116 via buffers/connector 352. Alternately, camera 110 may be implemented without removable memory 354 or buffers/connector 352. The orientation unit 560 can sense which position the digital camera 110 is currently in. The orientation unit 560 also sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In one embodiment, removable memory 354 is implemented using a flash disk. Power supply 356 supplies operating power to the various components of camera 110. In one embodiment, power supply 356 provides operating power to a main power bus 362 and also to a secondary power bus 364. The main power bus 362 provides power to imaging device 114, I/O 348, non-volatile memory 350, LCD controller 390, orientation sensor 560, DMA 572, image processing chain 573, and removable memory 354. The secondary power bus 364 provides power to power manager 342, CPU 344 and DRAM 346.

Power supply 356 is connected to main batteries 358 and also to backup batteries 360. In one embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main 358 have failed (when their output voltage has fallen below a minimum operational voltage level) the backup batteries 360 provide operating power to power supply 356 which then provides the operating power only to the secondary power bus 364 of camera 110.

Figure 4:
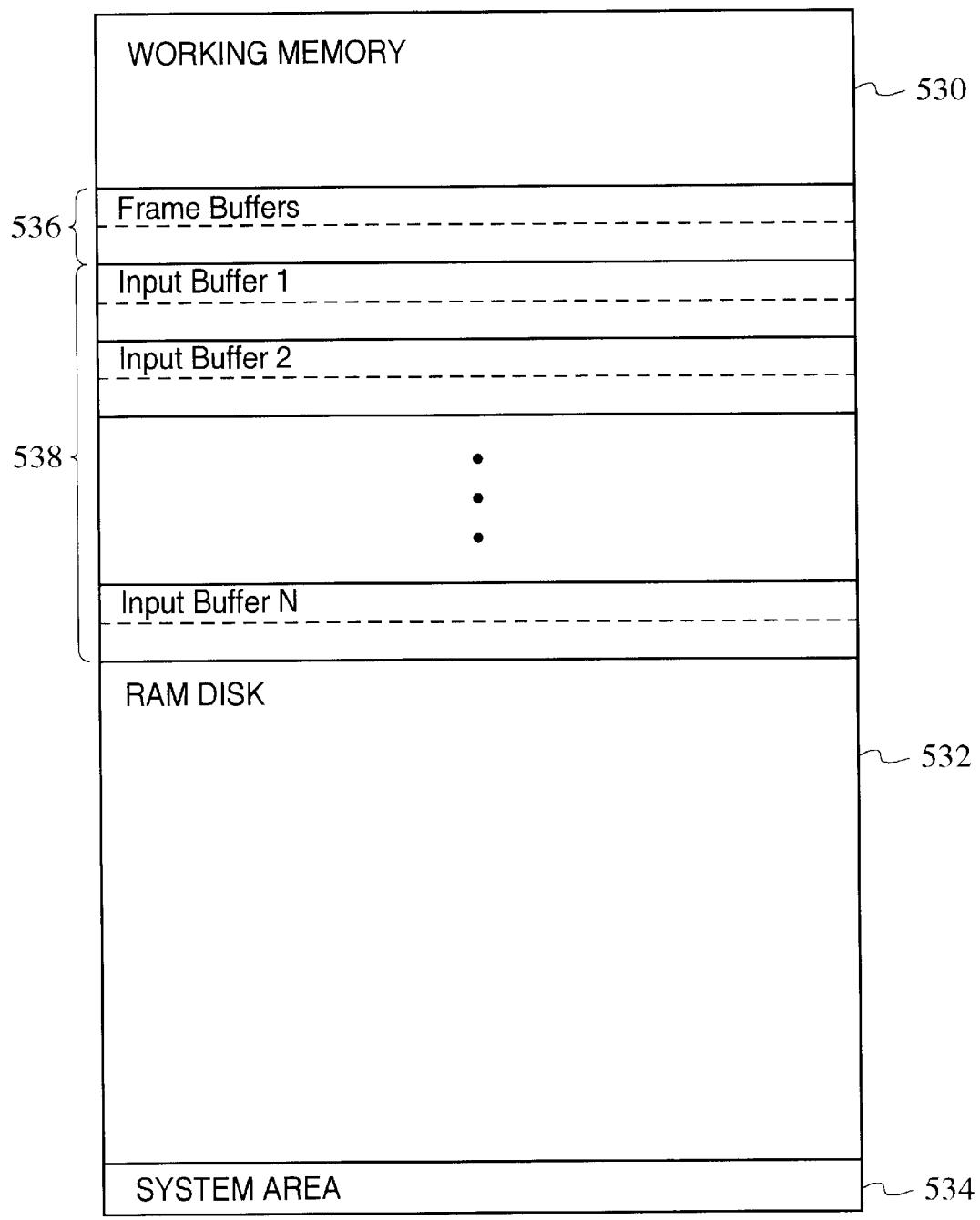
FIG. 4 is a memory map showing one embodiment of the Dynamic Random-Access-Memory (DRAM).

Referring now to FIG. 4, a memory map showing one embodiment of dynamic random-access-memory (DRAM) 346 is shown. In the preferred embodiment, DRAM 346 includes RAM disk 532, a system area 534, and working memory 530.

RAM disk 532 is an optional memory area used for storing raw and compressed image data and typically is organized in a "sectored" format similar to that of conventional hard disk drives. In one embodiment, RAM disk 532 uses a well known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Working memory 530 includes various stacks, data structures and variables used by CPU 344 while executing the software routines used within computer 118. Working memory 530 also includes several input buffers or one input buffer 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402.

Figure 5:
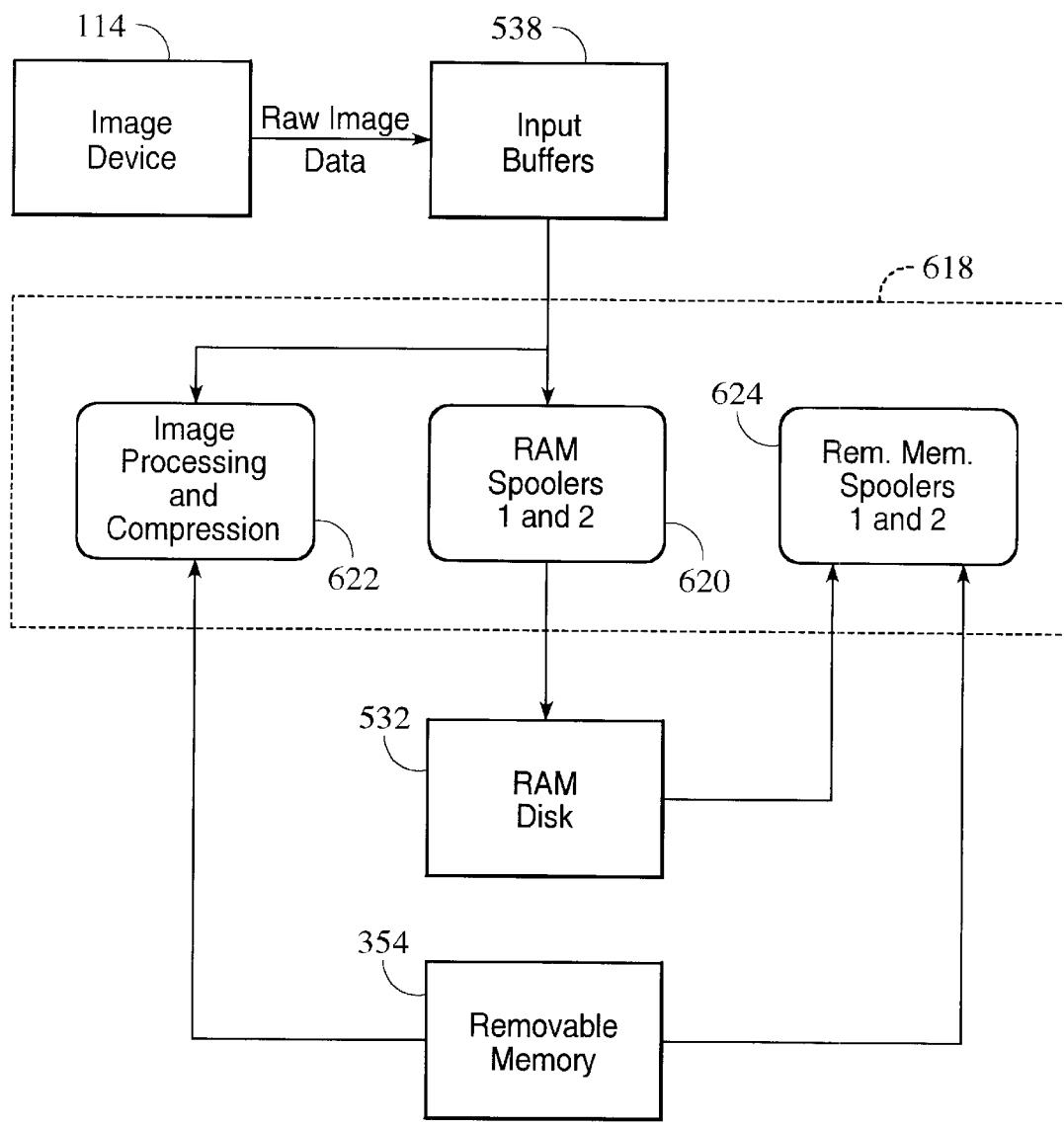
FIG. 5 is a block diagram illustrating the image file generation process where image processing is performed by software, which begins when the camera is in capture mode and the user presses a shutter button to capture an image.

Referring now to FIG. 5, a block diagram is shown of one embodiment of a portion of the image file generation process. The image file generation process begins when the camera is in capture mode and the user presses a shutter button (not shown) to capture an image. The raw image data is captured by the CCD array 224 in the image device 114 at a resolution set by the user and the raw image data is stored into an appropriate number of input buffers 538. In a preferred embodiment, the raw image data is transferred from the CCD array 224 to the input buffers 538.

The raw data in input buffers 538 is then transferred to background spooling 618 process for image processing and storage. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is to processed and compressed, which increases the capture rate of the digital camera.

The present invention provides for a method and system for allowing additional file formats to be available in a digital camera. During image processing, described above, the image file is stored in a particular format. A user may desire a file format which is different from file formats supported by the digital camera 110 as built. Moreover, the removable memory 354 may contain image files having a format which may not have been previously supported by the digital camera 110. A user may wish to display the images contained in these image files using the digital camera 110. The method and system allow the digital camera 110 to support file formats not available when the digital camera 110 was manufactured. The present invention will be described in terms of supporting a additional file formats en in capture devices, such as digital cameras, and on a host system. However, one of ordinary skill in the art will readily recognize that this method and system will operate effectively for other types of image capture devices.

Figure 6:
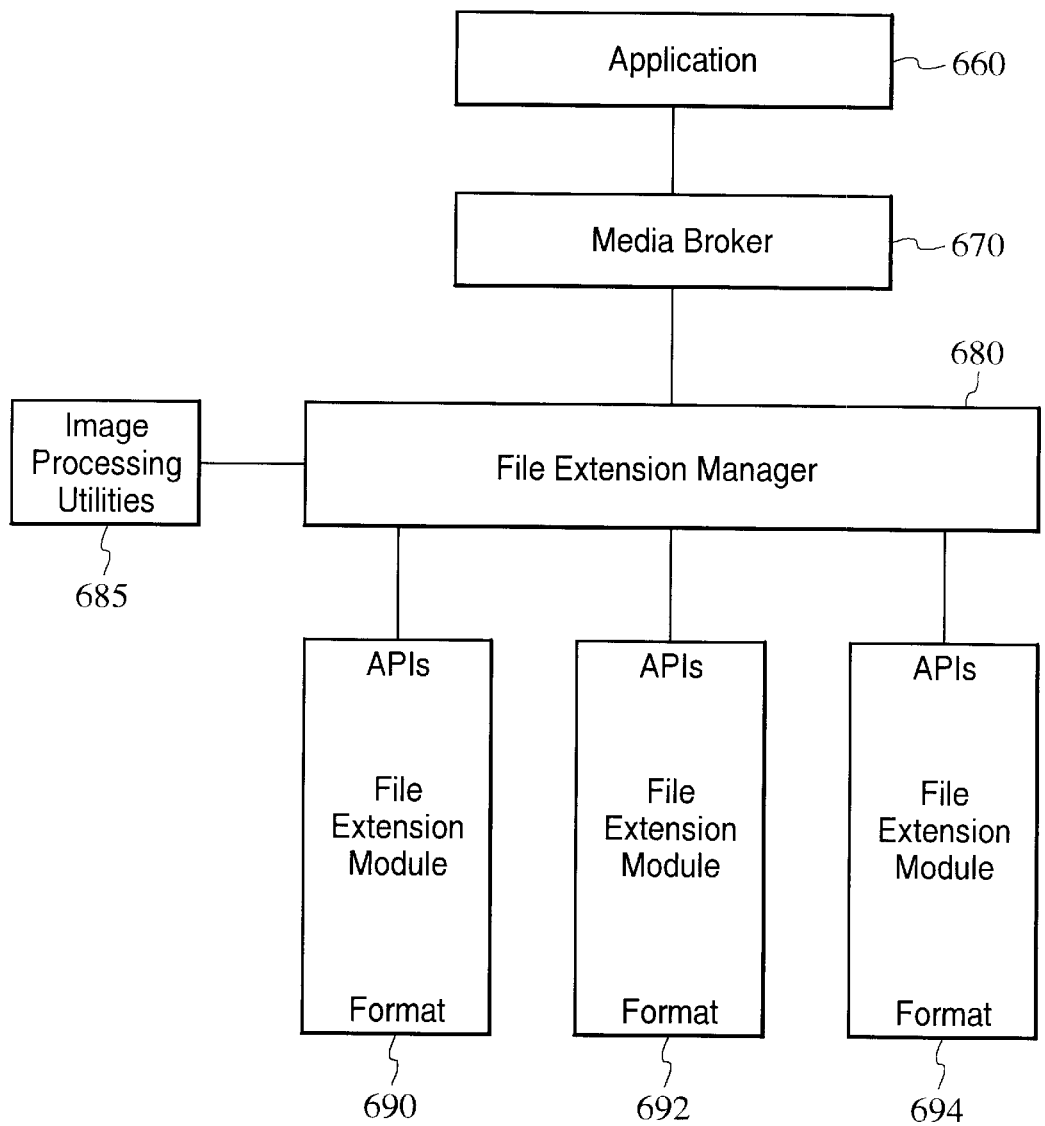
FIG. 6 is a block diagram illustrating a preferred embodiment of a system for allowing additional file format to be available in a digital camera in accordance with the present invention.

To more particularly illustrate the method system in accordance with the present invention, refer now to FIG. 6 depicting a block diagram of one embodiment of a system 650 for allowing additional file formats to be available. The system 650 includes an application 660 which may utilize the image files having file formats made available through the present invention. The media broker 670 provides communication between the application 660 and a management layer called the file extension manager 680. In the embodiment shown in FIG. 650, the file extension manager 680 includes image processing utilities 685. The image processing utilities 685 include but are not limited to compressor/decompressors, color space converters, image rotators, and support for sound data. In the system 650 depicted in FIG. 6, the file extension manager 680 communicates with file extension modules ("FEMs") 690, 692, and 694.

The FEMs 690, 692, and 694 are plug-in modules that provide support for file formats. In a preferred embodiment, one of the FEMs 690, 692, or 694 includes a "built-in" or default file format in which image files are stored if another file format is not chosen. In the preferred embodiment of the system 650, the FEM 690 includes the built-in file format. Thus, the system 650 as shown supports two additional file formats, one for each additional FEM 692, and 694. However, nothing prevents the system 650 from supporting a different number of additional file formats. In addition, nothing prevents the built-in file format from being provided through a mechanism other than the FEM 690.

Each FEM 690, 692, and 694 includes a file format and Application Program Interfaces (APIs). Each file format determines how an image file consistent with the file format is stored. For example, the formats for image data include TIFF, JPEG, and EXIF. Moreover, each file format may pack image data and other information stored in a file in different ways. Each FEM contains information regarding both the type of data stored in a file using the file format and how the data are packed in the file. The APIs allow the FEMs 690, 692, and 694 to communicate with the file extension manager 680. Consequently, the APIs are consistent with those developed for communication with the file extension manager 680.

The file extension manager is capable of communicating with the individual FEMs 690, 692, and 694 even though each FEM 690, 692, and 694 supports a different file format. Transfers of information between the file extension manager 680 and each of the FEMs 690, 692, and 694 are specific to the file formats supported by each FEM 690, 692, or 694. The file extension manager 680 also communicates with the media broker 670. Communication between the file extension manager 680 and the media broker 670, or another portion of the digital camera 110, is standardized and independent of the file formats of individual image files, not shown. Thus, calls made by the application 660 for image files are independent of the type of compression or the packing of data in the image files. As a result, the system 650 can support additional file formats which are unknown to the application 660 or not previously available on the digital camera 110 without rewriting the application 660 or other portions of the of the digital camera software.

Because the communication between the file extension manager 680 and the media broker 670 is standardized, a standardized file internal format is chosen. In a preferred embodiment, the internal format is used for communication between the file extension manager 680 and the media broker. Also in a preferred embodiment, the internal format is different from the "built-in" file format. In a preferred embodiment, this file internal format includes image data in YCC 422 format, thumbnails, screennails, and other image information. A thumbnail image is typically a small uncompressed, lower resolution version of the image data. A screennail is a medium-resolution version of the image and in a preferred embodiment is uncompressed. Although a specific internal format for communication between the file extension manager 680 and the remainder of the digital camera 110 is discussed, the method and system function for any internal format chosen.

In operation, the file extension manager 680 determines the file format of a particular image file, not shown. The corresponding FEM 690, 692, or 694 for the image file is then identified if the format is one supported by the FEMs 690, 692, or 694. In one embodiment, the three character extension in an image file name is used to determined the file format and, therefore, the corresponding FEM 690, 692, or 694. The identification includes determining not only how data are packed in the image file, but identifying individual components of the image file. For example, the file extension manager 680 not only identifies whether the image file contains a thumbnail, but also the size and type of thumbnail. The file extension manager 680 may also determine the type of data compression used for the image data.

Once the file format and appropriate FEM 690, 692, or 694 for the image file has been identified, the file extension manager 680 uses the APIs in the FEM 690, 692, or 694 to determine which of the image processing utilities 685 to use. The image processing utilities 685 convert the image file having the particular file format to the internal format, discussed above. For example, suppose the file format indicates that the image file contains a thumbnail having RGB data and that the thumbnail is not the standard size. The file extension manager 680 uses the appropriate image processing utilities 685 to convert the thumbnail to YCC data and resize the thumbnail. If required, the thumbnail may also be rotated. Thus, the cooperation between the file extension manager 680, the image processing utilities 685, and the FEMs 690, 692, and 694, allows the system 650 to identify the file format of an image file and convert the image file from the particular file format to the internal format which the remainder of the digital camera 110 can use. As a result, the file formats available for use by the digital camera 110 are increased by the addition of a new FEM 690, 692, or 694 having a different file format.

In one embodiment, a parameter manager, not shown, in conjunction with the application batteries 660 allows a user to view and set the available file formats. The parameter manager is described more fully in U.S. patent application Ser. No. 08/900,486 entitled "SYSTEM AND METHOD FOR CONTROLLING PARAMETERS IN AN ELECTRONIC IMAGING DEVICE" filed on Jul. 25, 1996 and assigned to the assignee of the present invention. Applicant hereby incorporates by reference the above-mentioned co-pending application.

Briefly, the parameter manager controls a variety of parameters used by the digital camera 110. The parameter manager in conjunction with the application 660 allows the user to view, store, and change values of these parameters. These parameters represent various operations and functional attributes of the digital camera 110. Such parameters include, but are not limited to; the exposure mode, the shutter specification, the focus distance specification, and the file formats in which the digital camera 110 can store an image file.

In this embodiment, the available file formats including those supported by the FEMs 690, 692, and 694 are stored as a "file type" parameter. The parameter manager can report the values of the file type parameter to the user through the user interface 408. A user can then select from the available file formats the format in which the user desires image files to be stored. As new file formats are added through new FEMs 690, 692, and 694, the values of this file type parameter are extended to incorporate the new file formats.

The system 650 is a preferred embodiment and has the image processing utilities accessed by the file extension manager 680. The system 650 is a preferred embodiment because the image processing utilities 685 are on the same level as and accessed by the file extension manager 680. As a result, the APIs for the image processing utilities need not be provided to a developer wishing to create FEMs. Instead, only the APIs used for communication to the file extension manager 680 are supported. However, new data formats may not be supportable by the converters present in the image processing utilities 685. For example, if an unknown color and space conversion is required to support a particular file format, the system 650 may not support the file format without the provision of additional APIs. Thus, the system will be able to pack the data having the unknown color space conversion differently in a file, but may not be able to convert the data to another form without providing additional APIs in the corresponding FEM.

Figure 7:
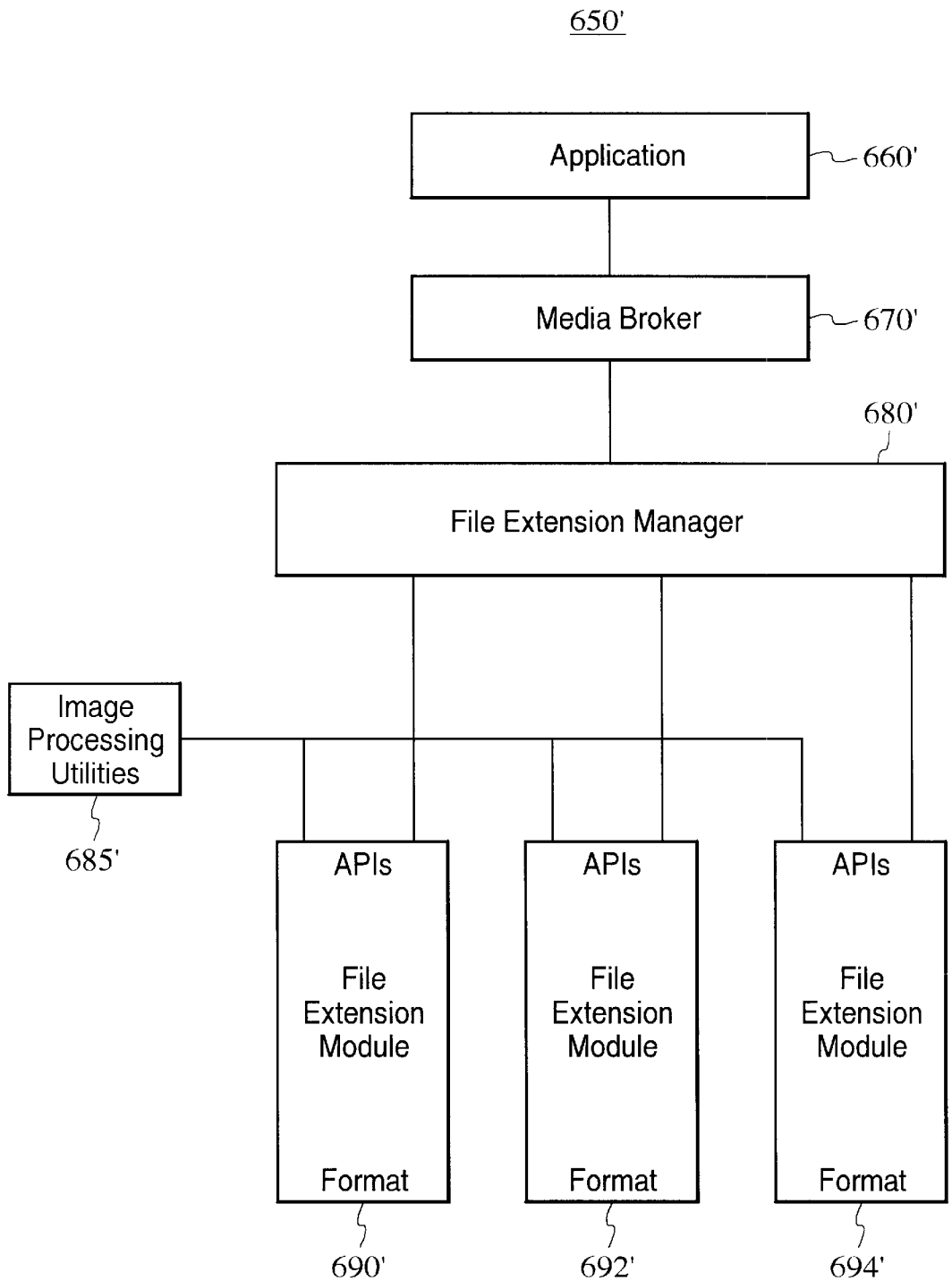
FIG. 7 is a block diagram illustrating a second embodiment of a system for allowing additional file formats to be available in a digital camera in accordance with the present invention.

FIG. 7 depicts an alternate embodiment of the system 650'. Components of the system 650' having a similar function to those depicted in the system 650 are labeled similarly. In the system 650', the individual FEMs 690' communicate directly with the image processing utilities 685'. Consequently; the APIs for the image processing utilities 685' are identified and specified so that developers can use these APIs. This allows the system 650' to support data types not supported by the image processing utilities 685' by using APIs providing in an FEM 690', 692', or 694' because the developer can also add new image processing utilities to the system 650' as needed along with the FEM 690', 692', or 694'. In the system 650, this could be done by including the image processing utility within the FEM, thus not making it available to other additional FEMs. In addition, other aspects of the file format, such as sound or how the data is packed into a file, may be controlled by the FEM 690', 692', or 694'. However, typically data conversion will still be provided by the image processing utilities 685'.

Figure 8:
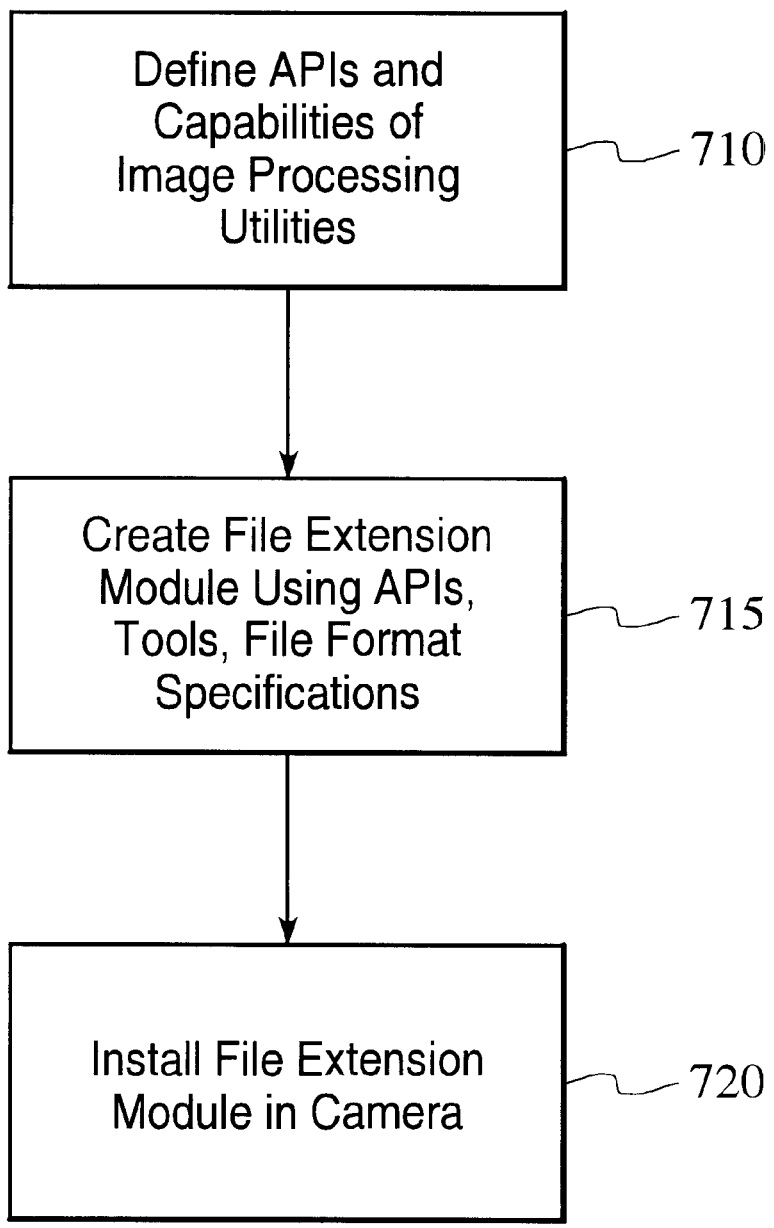
FIG. 8 is a simplified flow chart of one method for providing a system for allowing additional file formats to be available in a digital camera in accordance with the present invention.

In order to add available file formats using the systems 650 or 650', an FEM 690, 692, or 694 is developed. Refer now to FIG. 8 depicting one embodiment of a method 700 for providing an FEM 690, 692, or 694 to the digital camera 100. The APIs used for communication between the file extension manager 680 and the FEMs 690, 692, or 694 are defined and published in step 710. The capabilities of the image processing utilities 685 are also defined and disseminated via step 710. If the system 650' is to be used, then the APIs for the image processing utilities 685' are also defined and disseminated. However, the APIs for the image processing utilities 685' could also be expressed in the APIs of the FEMs 690', 692', or 694'. A developer then creates an FEM via step 715. In addition to using the previously defined APIs and image processing utilities 685, the developer also uses development tools and the specifications for the file format which is desired to be supported. The FEM can then be installed on the digital camera 110 for use by the user via step 720.

Figure 9:
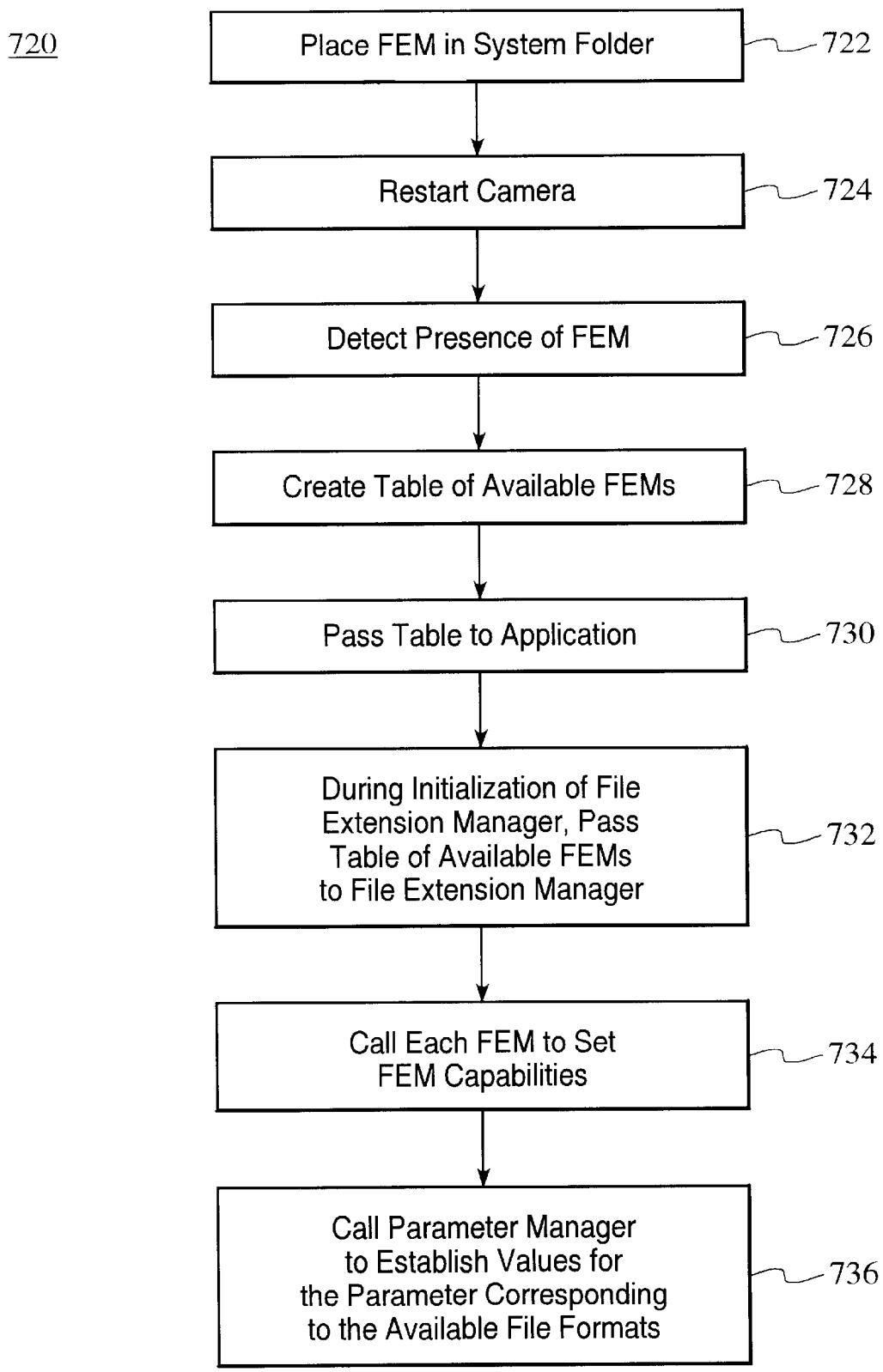
FIG. 9 is a more detailed flow chart depicting one method for installing a system for allowing additional file formats to be available in a digital camera in accordance with the present invention.

FIG. 9 depicts a more detailed flow chart of the step 720 of installing the FEM 690, 692, or 694 on the digital camera 110. First, the FEM 690, 692, or 694 is placed in a system folder, not shown, for the digital camera 110 via step 722. The FEM 690, 692, or 694 can be placed in system folder of the digital camera 110 in a variety of ways. For example, the FEM can be delivered to a host computer, not shown, on a computer-readable medium. This delivery can take place via the internet. The FEM 690, 692, or 694 can then be downloaded to the system folder of the digital camera 110 using the host software. In an alternate embodiment, the FEM 690, 692, or 694 can be provided on a medium that can be directly read by the digital camera 110. For example, the FEM 690, 692, or 694 may be placed on a removable memory 354 and placed in the system folder by the digital camera 110.

Once the FEM 690, 692, or 694 is placed in the system folder, the camera is restarted via step 724. During initialization, the presence of each FEM 690, 692, and 694, including any FEM 690, 692, or 694 just loaded, is detected via step 726. A table of available system files (FEMs 690, 692, and 694) is then created in step 728. This table is then provided to the application 660 via step 730. As a result, the application 660 is made aware of the available FEMs 690, 692, and 694.

During initialization of the file extension manager 680, the table of available FEMs 690, 692, and 694 is passed to the file extension manager 680 via step 732. Each FEM 690, 692, and 694 is then called to set the capabilities of the FEM 690, 692, and 694 via step 734. Thus, the file extension manager 680 is notified of the existence and capabilities of each FEM 690, 692, and 694. The parameter manager, not shown, is then called to establish the possible values for the file type parameter via step 736. As a result of step 736, as new FEMs 690, 692, and 694 are added to the system, the available values of the file type parameter are automatically updated. As a result, the FEMs 690, 692, and 694 are installed in the digital camera 10 and additional file formats have been made available to the digital camera 110.

Figure 10:
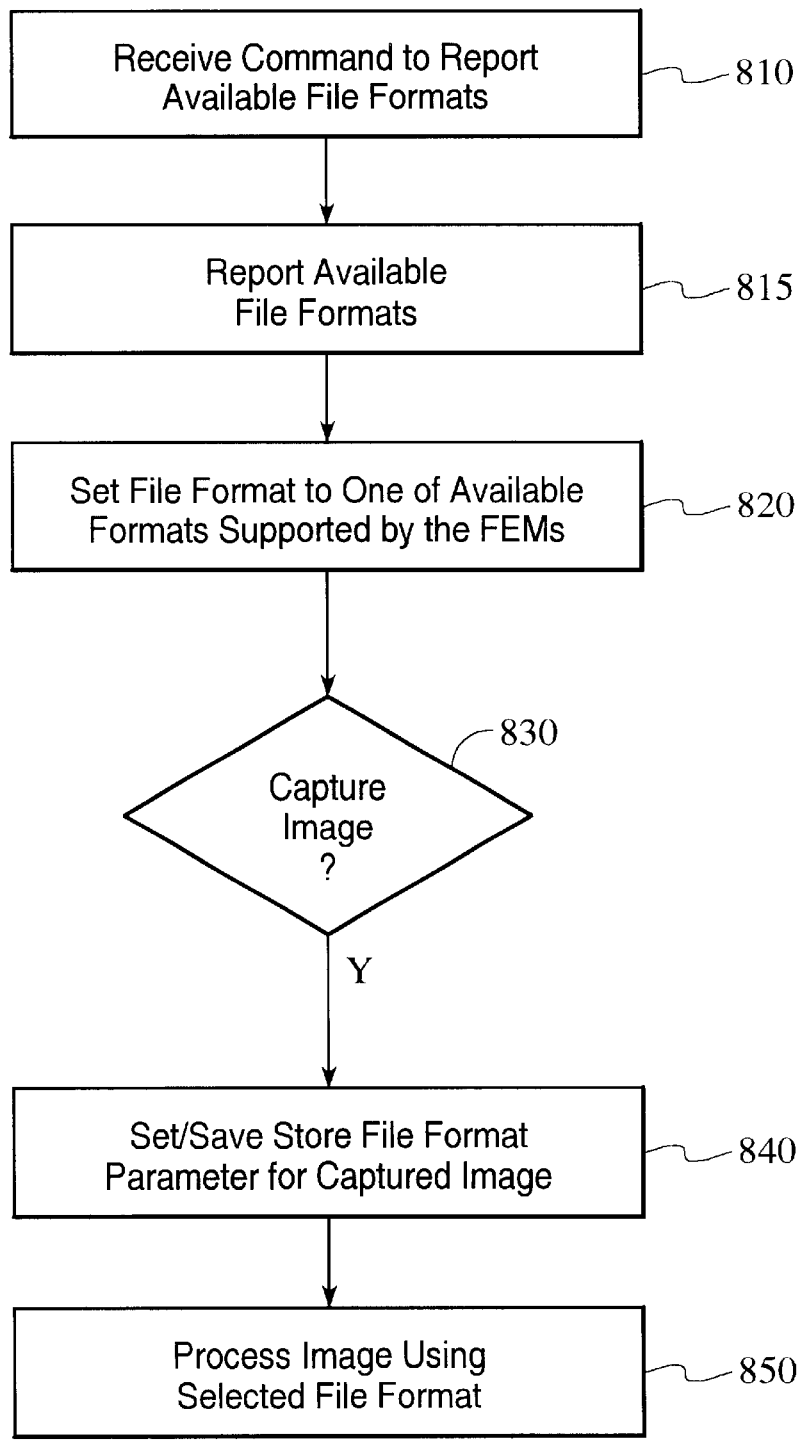
FIG. 10 is a flow chart depicting one method for setting a file format for storing an image file.

The available file formats are also reported to the user through the user interface 408. One of the file formats, typically the built-in file format supported by the FEM 690, is also set as the default, which the user can change. FIG. 10 depicts a method 800 for setting the file format in which image files are to be stored and subsequent capture of an image. If the user wishes to review or change the file format settings, the parameter manager receives a command to report the available file formats in step 810. In one embodiment, this command requests all possible values of the file format parameter. This command may be received from a variety of sources. For example, the get capabilities command could come from the user via the user interface 408, or from a host computer.

In response, the parameter manager reports the available file formats by reporting the possible values of the file format parameter in step 815. A user then selects the file format in which image files are to be stored or the current value of the file format is accepted in step 820. The file format is chosen from one of the available file formats supported by the FEMs 690, 692, or 694. Thus, the user selection or default sets value of the file format parameter.

It is then determined if an image is to be captured via step 830. If an image is not captured, then no further steps are taken. However, if an image is captured, then the file type parameter for the selected file format is stored with the raw image data via step 840. Then the image data is processed using the corresponding file format via step 850. The file type parameter is set and stored with the image data because in a preferred embodiment, image processing occurs in the background. Thus, the current value of the file type parameter could change during image processing. To prevent the digital camera 10 from storing the image file in an incorrect format, the file type parameter for the captured image is passed through the image processing chain with the image data being processed. The processed image file has the internal format discussed above. The file extension manager 680, image processing utilities 685, and the appropriate FEM 690, 692, or 694 indicated by the file type parameter then convert the image file from the internal format to the file format set by the user and indicated by the file type parameter stored with the image data.

Although FIG. 10 describes a method 800 including the step of setting the file format to a particular file type, note that in one embodiment, the file format is not set for reading an image file. Instead, the file extension manager 680 uses the three character extension in an image file name and works in conjunction with the FEMs 690, 692, and 694 to identify the appropriate format and FEM 690, 692, or 694 for reading the file. The image file is then read and converted as discussed with respect to FIGS. 6 and 7. The file format is not chosen when reading an image file because the file format of an image file already in existence is typically dictated by the actual format of the image file, rather than by the user. Note that in one embodiment, image files can be read and written in parallel. Thus, an image file can be processed in a user selected file format; supported by the FEMs 690, 692, or 694, as an image file of another format is being read.

The system 650 or 650' may support image file translations as well as automatically providing to user the additional file formats available. This translation feature is an additional advantage of the method and system. Because the system 650 supports additional file formats, the system 650 is also capable of translating image files between the available file formats.

Figure 11A:
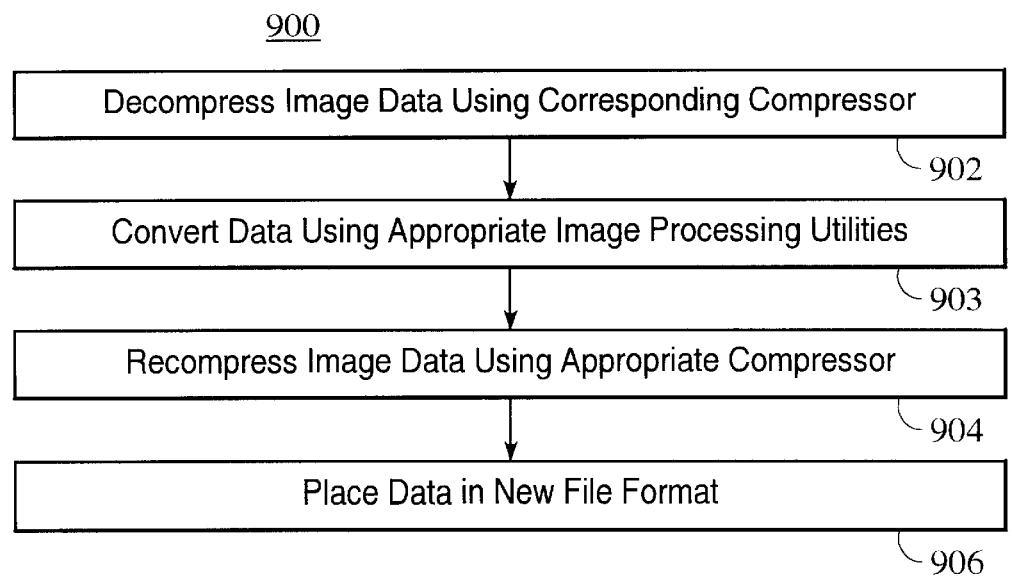
FIG. 11A is a flow chart of one method for translating a file to a second format in accordance with the present invention.

FIG. 11A is a flow chart of one method 900 for translating a file between two supported formats. The image data in an image file to be translated, not shown, is decompressed via step 902. The appropriate decompressor, not shown, in the image processing utilities 685 is chosen based on the FEM 690, 692, or 694 which supports the file format of the image file to be translated. The image data is then converted using the appropriate data processing utilities via step 903. For example, this conversion may include color and space conversion as well as rotation. The image data is then recompressed in step 904. The appropriate compressor, not shown, in the image processing utilities 685 is chosen based on the FEM 690, 692, or 694 supporting the file format to which the image file is to be translated. The data for the translated image file is then packed in the appropriated format via step 906. Thus, the image file is read from the file format of the image file to be translated to an internal format and written from the internal format to the file format into which the image file is to be translated. Translation of an image file may also reformat the thumbnail, screennail, sound, or other image information as required. For example, the thumbnail may be rotated during translation. As a result, an image file has been translated from one supported format to another supported format.

Figure 11B:
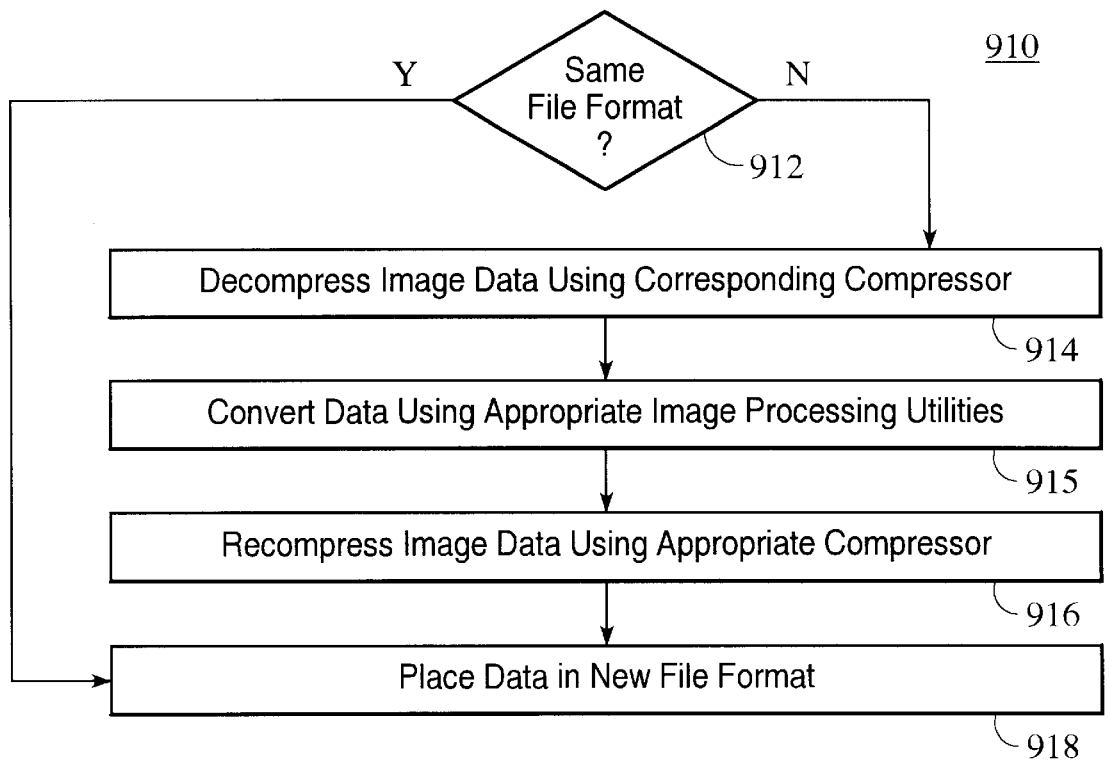
FIG. 11B is a flow chart of a second method for translating a file to a second format in accordance with the present invention.

FIG. 11B depicts another embodiment of a method 910 for translating an image file. In step 912 it is determined if the image data in the image file is compressed in the same manner as the file format to which the image file is to be translated. If the image data is compressed in the same manner, then via step 918, the data in the image file is simply packed as dictated by the file format to which the image file is being translated. If the image data is to be compressed in a different manner, then steps 914 through 916 are performed. Steps 914 through 916 correspond to steps 902 through 904 of the method 900 depicted in FIG. 11A. Referring back to FIG. 11B, step 918, packing the image data in the appropriate manner, is then performed. Thus, an image file can be translated between two supported formats. In the method 910, image data is only decompressed and recompressed if required. This same method can also translate the screennails, thumbnails, or sound between formats.

Figure 12:
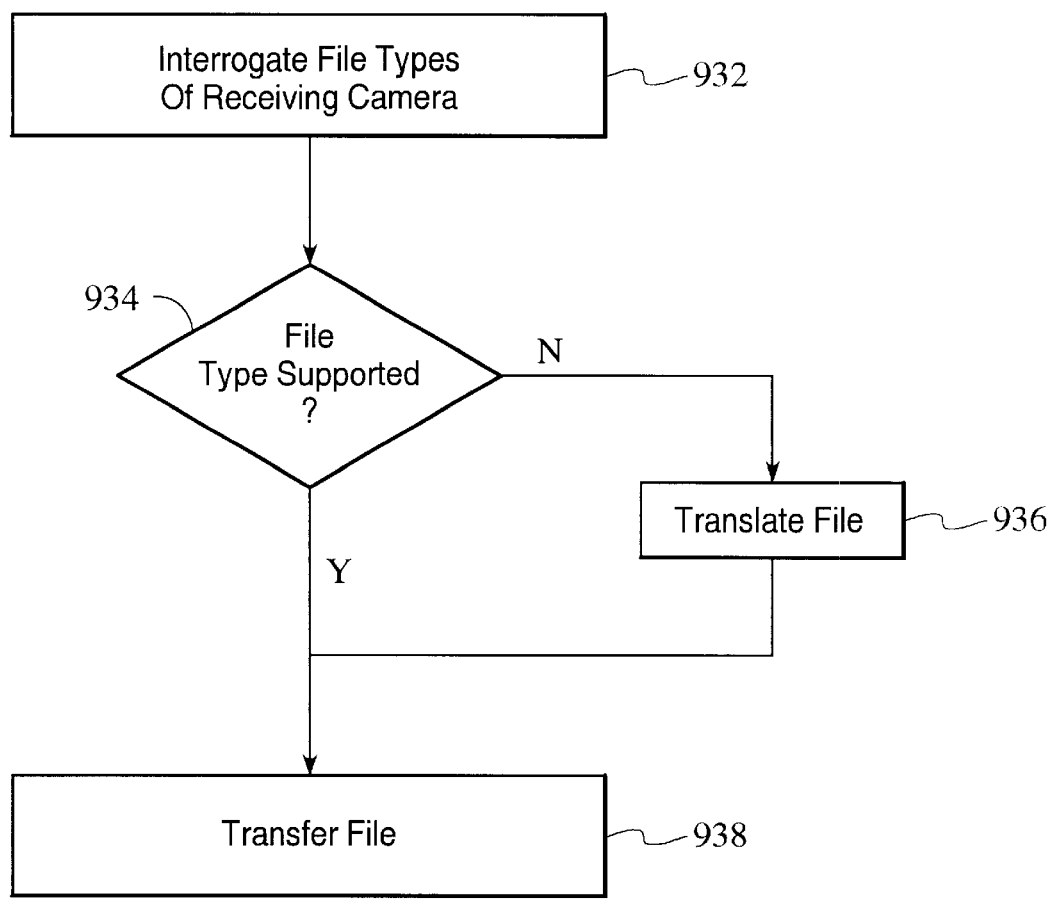
FIG. 12 is a flow chart depicting one method for transferring files in accordance with the present invention.

The ability of the system 650 to translate image files between supported formats is particularly useful where an image file is to be transferred from the digital camera 110 to a host, not shown, or another imaging device, not shown. Refer now to FIG. 12 depicting one embodiment of a method 930 for transferring a file from the digital camera 110 to a receiving device, not shown. The digital camera 110 first interrogates the available file formats of the receiving device via step 932. In one embodiment, this interrogation can be performed by requesting the values of a file type parameter of the receiving device. In another embodiment, the receiver's file type is known from the communications protocol. If the file format of a file type of the receiving camera is the same as the file format of the image file to be sent, then the file is transferred via step 938. If however, the file format of the receiving camera is not the same as the image file and is supported by the digital camera 110, for example through the FEM 690, 692, or 694, then the file is translated via step 936. The translation step 936 may be accomplished using the method 900 or the method 910 of FIG. 11A or FIG. 11B, respectively. The translated file can then be transferred via step 938. Also note that file translation may include rotation or unrotation of images as well as downsizing of images. Changes in format include: compression format and data format, rotation or no rotation, thumbnail size, thumbnail rotation, thumbnail format, screennail size, screennail rotation, and screennail format. Thus, the digital camera 110 can translate files, if necessary, and transfer the translated files to another device.

A method and system has been disclosed for allowing additional file formats to be available in an imaging device. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for adding new file formats on a digital imaging device, the digital imaging device also including at least one built-in file format, the at least one built-in file format capable of including all file formats which the digital imaging device is provided during manufacture, the method comprising the steps of:

allowing a user to load a first file extension module including a second file format previously unsupported by the digital imaging device;

providing a management layer, the management layer for communicating with the first file extension module to write or read an image file having the second file format and for communicating with a portion of the digital imaging device using an internal format that includes the at least one built-in file format;

providing at least one data processing utility, the data processing utility for converting data between the second file format and the internal format; and for a capturing an image to be stored in the second format, storing the image in the internal first and using the management layer, the first file extension module and the at least one data processing utility to convert the image from the internal format to the second file format;

thereby allowing the digital imaging device to support the at least one built-in first file format and the second file format added by the user without requiring that any of the at least one built-in file format be replaced.

2. The method of claim 1 further comprising the steps of allowing for translation an image file from the second file format to a third file format in the digital imaging device.

3. The method of claim 2 wherein the image file includes image data compressed using a first compression algorithm and data relating to the image, the third file format specify that the image data be compressed using a second compression algorithm, the method comprising the steps of:

decompressing the image data using a compressor/decompressor corresponding to the first data compression algorithm;

converting the image data and the data relating to the image from a first type used by the second file format to a second type used by the third file format;

compressing the image data using the second compression algorithm; and placing the image data compressed using the second compression algorithm and the information relating to the image data in an order required by the third file format.

4. The method of claim 2 further comprising the step of:

allowing a user to transfer an image file from the digital imaging device to a second digital imaging device, the second digital imaging device supporting the third file format, the method comprising the steps of:

if the image file is in the second file format, translating the image file to the third file format and transferring the translated file to the second digital imaging device; and if the image file is in the third file format, transferring the image file to the second digital imaging device.

5. The method of claim 1 wherein the step of allowing a user to load the first file extension module further comprises the step of providing a plurality of commands for communicating with the management layer.

6. The method of claim 5 wherein the plurality of commands further includes a plurality of Application Program Interfaces (APIs).

7. The method of claim 6 wherein the digital imaging device includes a user interface and wherein the method further includes the steps of:

automatically providing an availability of the built-in first file format and an availability of the second file format to the user interface.

8. The method of claim 7 wherein the step of automatically providing the availability of the built-in first file format and the availability of the second file format further comprises the step of:

updating a plurality of values of a file type parameter, the plurality of values indicating the availabilities of the second file format and the availability of the built-in first file format.

9. The method of claim 8 wherein the step of automatically providing the availability of the second file format further comprises the steps of detecting the presence of the first file extension module;

creating a table of available file formats, the table including the built-in first file format and the second file format;

during an initialization of the management layer, providing the table to the management layer; and calling the first file extension module extension module to set the capabilities of the first file extension module.

10. The method of claim 9 wherein the data processing utility is accessed by the management layer.

11. The method of claim 9 wherein the data processing utility is accessed by the first file extension module.

12. The method of claim 11 wherein the step of allowing the user to load the first file extension module further includes the step of:

providing a second plurality of APIs for communicating between the first file extension module and the data processing utility.

13. A system for adding file formats to a digital imaging device including at least one built-in file format, the at least one built-in file format capable of including all file formats which the digital imaging device is provided during manufacture, the system comprising:

at least one file extension module including a corresponding file format previously unsupported by the digital imaging device, the at least one file extension module capable of being loaded to the digital imaging device by a user;

a management layer coupled to the at least one file extension module, the management layer for communicating with the at least one file extension module to write to or read an image file having the corresponding file format, the management layer also for communicating with a portion of the digital imaging device using an internal file format that includes the at least one built-in file format;

a plurality of data processing utilities, the data processing utilities for converting data between the internal file format and the corresponding format of the at least one file extension module such that for capturing an image to be stored in the second format, the image is first stored in the internal format and converted from the internal format to the second file format using the management layer, the at least one file extension module and a portion of the plurality of data processing utilities;

thereby allowing the digital imaging device to support the at least one built-in first file format and the corresponding file format added to the digital imaging device without requiring that any of the at least one built-in file format be replaced.

14. The system of claim 13 wherein the at least one file extension module further includes a plurality of commands for communicating with the management layer.

15. The system of claim 14 wherein the plurality of commands further includes a plurality of Application Program Interfaces (APIs) for communicating with the management layer.

16. The system of claim 15 wherein the digital camera includes a user interface; the system further comprising:

means for automatically providing an availability of the corresponding file format to the user interface.

17. The system of claim 16 wherein the means for automatically providing the availability of the corresponding file format further comprises:

a parameter manager for updating a plurality of values of a file type parameter, the plurality of values indicating the additional file formats available and the built-in first file format.

18. The system of claim 17 wherein the data processing utilities are coupled to the management layer.

19. The system of claim 17 wherein the at least one file extension module further includes a first and a second file extension module; and wherein the management layer, the data processing utilities, the first file extension module, and the second file extension module are capable of translating an image file from a first file format corresponding to the first file extension module to a second file format corresponding to the second file extension module.

20. The system of claim 17 wherein the management layer, the data processing utilities are capable of transferring the image file to a second digital imaging device, the second digital imaging device supporting at least one format of a plurality of additional file formats available and the built-in file format, wherein the image file is translated to the at least one format if the image file is not already have the at least one file format.

21. The system of claim 17 wherein the data processing utilities are coupled to the at least one file extension module.

22. The system of claim 21 wherein the at least one file extension module further includes a second plurality of APIs for communicating with the data processing utilities.

23. A computer-readable medium containing a program for allowing a user to add new file formats to a digital imaging device including a built-in file format, the at least one built-in file format capable of including all file formats which the digital imaging device is provided during manufacture, the program containing program instructions for:

allowing a user to load a first file extension module including a second file format previously unsupported by the digital imaging device providing a management layer, the management layer for communicating with the first file extension module to support an image file having the second file format and for communicating with a portion of the digital imaging device using an internal format that includes the at least one built-in file format;

providing a plurality of data processing utilities for converting data between the second file format and the internal format; and for a capturing an image to be stored in the second format, storing the image in the internal first and using the management layer, the first file extension module and the at least one data processing utility to convert the image from the internal format to the second file format;

thereby allowing the digital imaging device to support the at least one built-in first file format and the second file format added by the user without requiring that any of the at least one built-in file formats be replaced.

24. The computer-readable medium of claim 23 wherein the digital camera includes a user interface and wherein program further includes a program instruction for:

automatically providing an availability of the second file format to the user interface.

25. The computer-readable medium of claim 24 wherein the program instruction for automatically providing the availability of the second file format further comprises a program instruction for:

updating a plurality of values of a file type parameter, the plurality of values indicating the additional file formats available and the built-in file format.

26. The computer-readable medium of claim 25 wherein the program instruction for automatically providing the availability of the first file extension module further comprises program instructions for:

detecting the presence of the first file extension module;

creating a table of available file formats, the table including the built-in first file format and the second file format;

during an initialization of the management layer, passing the table to the management layer; and calling the first file extension module extension module to set the capabilities of the first file extension module.

27. The computer-readable medium of claim 26 containing program instructions for allowing the data processing utilities to be accessed by the management layer.

28. The computer-readable medium of claim 26 further containing program instructions for allowing the data processing utilities to be accessed by the first file extension module.

29. The computer-readable medium of claim 28 wherein the program instruction for loading the first file extension module further includes program instructions for:

providing a second plurality of APIs for communicating between the first file extension module and the data processing utilities.

30. A system for adding file formats to a digital camera including built-in file format, the at least one built-in file format capable of including all file formats which the digital imaging device is provided during manufacture, the system comprising:

at least one file extension module including information relating to a corresponding file format and a plurality of application program interfaces (APIs), the corresponding file format previously unsupported by the digital camera;

a management layer coupled to the at least one file extension module, the management layer for communicating between the at least one file extension module using the plurality of APIs to write or read an image file having the corresponding file format, the management layer also for communicating with a portion of the digital camera using an internal format that includes the at least one built-in file format;

a plurality of data processing utilities for converting data between the internal format and the corresponding file format of the at least one file extension module such that for capturing an image to be stored in the second format, the image is first stored in the internal format and converted from the internal format to the second file format using the management layer, the at least one file extension module and a portion of the plurality of data processing utilities; and a parameter manager for automatically providing an availability of the corresponding file format to a user interface by updating a plurality of values of a file type parameter, the plurality of values indicating the additional file formats available and the built-in first file format;

thereby allowing the digital imaging device to support the at least one built-in first file format and the corresponding file format added to the digital camera without requiring that any of the at least one built-in file formats be replaced.

31. A digital imaging device capable of translating an image file from a first file format to a second file format, the image file containing image data compressed using a first compression algorithm and information relating to the image data, the second file format specifying that the image data be compressed using a second compression algorithm, the digital imaging device comprising:

a first file extension module including the first file format;

a second file extension module including the second file format;

a management layer coupled to the first file extension module and to the second file extension module, the management layer for communicating with the first file extension module to write or read an image file having the first file format and for communicating with the second file extension module to write or read an image file having the second file format, the management layer also for communicating with a portion of the digital imaging device using an internal file format; and a plurality of data processing utilities, the plurality of data processing utilities for decompressing the image data using a first decompression algorithm corresponding to the first compression algorithm and compressing the image data using the second compression algorithm and for placing the compressed image data compressed using the second compression algorithm and the compressed information relating to the image data in an order required by the second file format;

wherein the first file format or the second file format are capable of being loaded by a user after the digital imaging device is manufactured thereby allowing the image file to be translated from the first file format to the second file format without requiring additional hardware to be provided for the digital imaging device; and wherein if the first file format is loaded after the digital imaging device is manufactured then the digital imaging device is capable of supporting both the first file format and all of at least one built-in file format, wherein if the second file format is loaded after the digital imaging device is manufactured then the digital imaging device is capable of supporting both the second file format and all of the at least one built-in file format, and wherein if both the first file format and the second file format are loaded after the digital imaging device is manufactured, then the digital imaging device is capable of supporting both the first file format and the second file format and all of at least one built-in format with which the digital imaging device was manufactured, the at least one built-in file format capable of including all file formats which the digital imaging device is provided during manufacture.

32. A digital imaging device capable of transferring an image file from the digital imaging device to a second digital imaging device, the digital imaging device supporting a first file format and a second file format, the second digital imaging device supporting the second file format, the first file format using a first compression algorithm, the second file format using a second compression algorithm, the digital imaging device comprising:

means for determining whether the image file has the first file format or the second file format;

a first file extension module including the first file format;

a second file extension module including the second file format;

a management layer coupled to the first file extension module and to the second file extension module, the management layer for communicating with the first file extension module to write or read an image file having the first file format and for communicating with the second file extension module to write or read an image file having the second file format, the management layer also for communicating with a portion of the digital imaging device using an internal file format; and a plurality of data processing utilities, the plurality of data processing utilities for decompressing the image data using a first decompression algorithm corresponding to the first compression algorithm and compressing the image data using the second compression algorithm and for placing the compressed image data compressed using the second compression algorithm and thez compressed information relating to the image data in an order required by the first file format;

wherein the image file is transferred to the second digital imaging device if the image file has the second file format and wherein the image file is translated from the first file format to the second file format if the image file has the second file format;

wherein the first file format or the second file format are capable of being loaded by a user after the digital imaging device is manufactured; and wherein if the first file format is loaded after the digital imaging device is manufactured then the digital imaging device is capable of supporting both the first file format and all of at least one built-in file format, wherein if the second file format is loaded after the digital imaging device is manufactured then the digital imaging device is capable of supporting both the second file format and all of the at least one built-in file format and wherein if both the first file format and the second file format are loaded after the digital imaging device is manufactured, then the digital imaging device is capable of supporting both the first file format and the second file format and all of at least one built-in format with which the digital imaging device was manufactured, the at least one built-in file format capable of including all file formats which the digital imaging device is provided during manufacture;

thereby allowing the image file to be transferred to the second digital imaging device without requiring additional hardware to be provided for the digital imaging device.

* * * * *